United States Patent [19]

Lisle, Jr.

[11] Patent Number: 5,369,411
[45] Date of Patent: Nov. 29, 1994

[54] IMBALANCE CORRECTION OF IN-PHASE AND QUADRATURE PHASE RETURN SIGNALS

[75] Inventor: Thomas K. Lisle, Jr., Ellicott City, Md.

[73] Assignee: Westinghouse Electric Corporation, Pittsburgh, Pa.

[21] Appl. No.: 69,499

[22] Filed: Jun. 1, 1993

[51] Int. Cl.⁵ ............................................. G01S 7/40
[52] U.S. Cl. ................................... 342/194; 342/174; 342/162; 342/151
[58] Field of Search ............... 342/160, 161, 162, 194, 342/195, 151, 174

[56] References Cited

U.S. PATENT DOCUMENTS

| | | | |
|---|---|---|---|
| 4,122,448 | 10/1978 | Martin | 342/174 |
| 4,616,229 | 10/1986 | Taylor, Jr. | 342/171 |
| 4,876,489 | 10/1989 | Cawthorne | 342/383 |
| 5,059,968 | 10/1991 | Thompson et al. | 342/152 |
| 5,105,195 | 4/1992 | Conrad | 342/174 |
| 5,124,708 | 6/1992 | Mackes et al. | 342/174 |
| 5,150,128 | 9/1992 | Konkelbeck | 342/174 |
| 5,248,982 | 9/1993 | Reinhardt et al. | 342/375 |
| 5,293,325 | 3/1994 | Roos | 342/91 X |

Primary Examiner—John B. Sotomayor
Attorney, Agent, or Firm—Eugene LeDonne

[57] ABSTRACT

A method of correcting phase and amplitude imbalances of I and Q components using digital correction coefficients. The amplitude Gc and phase coefficient Pc obtained solely in the time domain from a pilot signal. The I and Q components of the pilot signal are sampled over at least one integer cycle after which the number of samples taken during an integer number of cycles is determined for the samples of the component with the steepest slope. The sums of self and cross products are used to calculate the coefficients.

15 Claims, 5 Drawing Sheets

IMBALANCE CORRECTION OF IN-PHASE AND QUADRATURE PHASE RETURN SIGNALS

BACKGROUND OF THE INVENTION

1. Field of Invention

The present invention relates to signal processing; and more particularly; to a system and method for correcting imbalances between In-phase (I) and Quadrature (Q) phase components of radiant energy signals.

While the invention is subject to a wide range of applications, it is especially suited for use in balancing (I) and (Q) components of radar receiver return signal, and will be particularly described in that connection.

2. Description of Related Art

In practically all moving target indication (MTI) radar systems the incoming signals are divided into I and Q components to detect the return signal vector phase shift caused by target motion. The I and Q components of the detected signals are processed and converted to complex numbers, with the I components corresponding to real numbers, and the Q components corresponding to imaginary numbers. The received components in the form of an IF signals are down-converted to base band by one or more converters the last one being an I/Q converter. The output of the I/Q converter is low pass filtered to remove the sum product and retain the difference frequency terms:

$$I(t) = A \cos \omega t$$

$$Q(t) = A \sin \omega t$$

where t=time in seconds, A=amplitude, and $\omega$=radians per second,

This pair of signals can be treated as a complex signal:

$$I(t) + JQ(t) = A \exp (J\omega t)$$

where J is the square root of minus one.

This ideal signal is valid only if the gains of the I and Q paths are equal; and if the phase difference between the I and Q channels is 90 degrees. Gain or phase imbalances of any kind will cause an image response at the negative of the signal frequency. However, because of manufacturing tolerances, ambient conditions, and aging factors, for example, the particular devices that are involved in converting the return signals to the Q components, at times, generate Q components that do not correspond to the amplitude of the I component, or generates Q components that are less than or greater than ninety degrees out-of-phase with the I components. Image power of radar receiver is typically 25–35 dB below the signal power for typical quadrature converter chains with amplitude imbalances of 0.5 dB, and phase imbalances of three degrees.

Correction of such in,balances may be accomplished by adjusting the phase and amplitude of the analog signal either in the signal path and/or the local oscillator path prior to quadrature mixing using feedback; or correcting in a feed forward manner the phase and amplitude of the complex signal after conversion. Correction after conversion may be either analog or digital. Since analog phase correction is not convenient at frequencies near DC, the known correction schemes are subsequent to the A/D conversion of the components (i.e., digital). A side benefit of I/Q correction is DC offset removal, which is obtained readily from the techniques used to measure the phase and amplitude imbalances.

One well known and effective imbalance correction technique is described in an article by F. E. Churchill et al. published in Volume AES-17, No. 1, dated January 1981 of IEEE Transaction of Aerospace and Electronic Systems. In this technique coefficients are derived from a test tone or pilot signal, which are applied to the complex digitized data. Measurement of the pilot tone to find the coefficients can be done in either the time or frequency domains. Prior to the present invention, the time domain process was restricted to four samples of the pilot tone spaced 90 degrees apart. This prior art technique requires a precise frequency relationship between the pilot tone and the pilot tone sampling rate. It is possible to overcome this disadvantage by performing calculations via FFT processing to remove the sample rate restriction. However, this complicates the radar receiver, particularly microprocessor based radar receiver controller mechanizations.

To overcome the above disadvantages, in excess of four times the data samples were used to get a better signal to noise ratio, and phase samples were taken at other than ninety degree spacing. However, a precise number of cycles of the phase samples of the test tone were still required to be sampled, restricting the test tone frequency/sampling rate to a specific number of cycles of the sampled test tone. Additionally, in calculating the correction coefficients, transcendental functions (that is sine and cosine functions) are required, which also may be burdensome for microprocessor mechanizations.

In light of the foregoing, there is need for a system and method for correcting imbalances in the I and Q components of a target return signal that operates as effectively as the known systems and methods, but is simpler, more efficient and can be implemented readily in microprocessor mechanizations.

SUMMARY OF INVENTION

One advantage of the present invention is the provision of a system and method for correcting imbalances in I/Q components of a target return signal which substantially obviates one or more of the limitations and disadvantages of the described prior methods and techniques.

Additional features and advantages of the invention will be set forth in the description which follows, and in part will be apparent from the description, or may be learned by practice of the invention. The specific advantages and other objects and advantages of the invention will be realized and attained by the system and method particularly pointed out in the written description and claims hereof as well as the appended drawings.

To achieve these and other objects and advantages and in accordance with the purpose of the invention, as embodied and broadly described herein, the invention is a method for correcting phase and amplitude in%balances between (I) and (Q) components of a radiant energy return signal that converts each of the (I) and (Q) phase components of the received signal into digital data; and includes calculating phase and amplitude correction coefficients solely in the time domain for the (Q) component of the signal in accordance with the number and amplitude of samples taken from a selected one of the (I) and (Q) components of a pilot tone during an integer cycle of at least one cycle of the pilot tone;

multiplying the digital data of the (I) component of the received signal by the calculated phase coefficient to obtain a first product; multiplying the digital data of the Q component of the received signal by the amplitude (gain) coefficient to obtain a second product; and adding the first and second products to obtain a corrected Q component of the received signal having a phase and amplitude substantially corresponding to the 90 degree phase and amplitude of the (I) component of the received signal.

It is to be understood that both the foregoing general description and the following detailed description are exemplary and explanatory and are intended to provide further explanation of the invention as claimed.

The accompanying drawings, which are incorporated in and constitute a part of this specification, illustrate one embodiment of the invention and together with the description serve to explain the principles of the invention.

DETAILED DESCRIPTION

Reference will now be made in detailed to the present preferred embodiment of the invention, an example of which is illustrated in the accompanying drawings.

Figure 1:
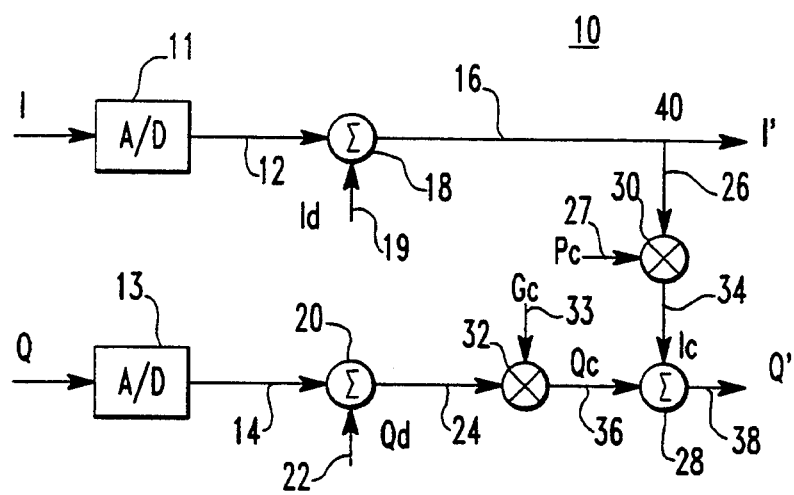
FIG. 1 is a schematic block diagram of a system for generating balanced I and Q components of a radiant energy return signal by utilizing amplitude and phase correction coefficients calculated in accordance with the principles of the present invention.

An exemplary embodiment of a system utilizing the principles of the present invention is shown in FIG. 1, and is designated generally by reference numeral 10. The system 10 has inputs 12 and 14 coupled to respective outputs of analog to digital converters 11 and 13 of a radar receiver (not shown). Input 12 is connected to a summing device 18 to which a DC offset signal Id is also input on line 19. A summing device 20, which is connected to input 14 is also connected to input 22 to which a DC offset signal $Q_d$ is applied. System 10 also includes a multiplier 30, a multiplier 32, and a summing device 28. The output from summing device 16 is input to multiplier 26 where it is multiplied by a phase correction coefficient $P_c$ input at 27. The output from summing device 20 is input to the multiplier 32 where it is multiplied by an amplitude coefficient $G_c$ from line 33. The phase corrected component (Ic) at the output of multiplier 30 on line 34 is summed with the amplitude corrected Qc component on line 36 at the summing device 28 to produce a Q' component on line 38 which is the Q corrected component of the I' component on line 40.

Figure 2:
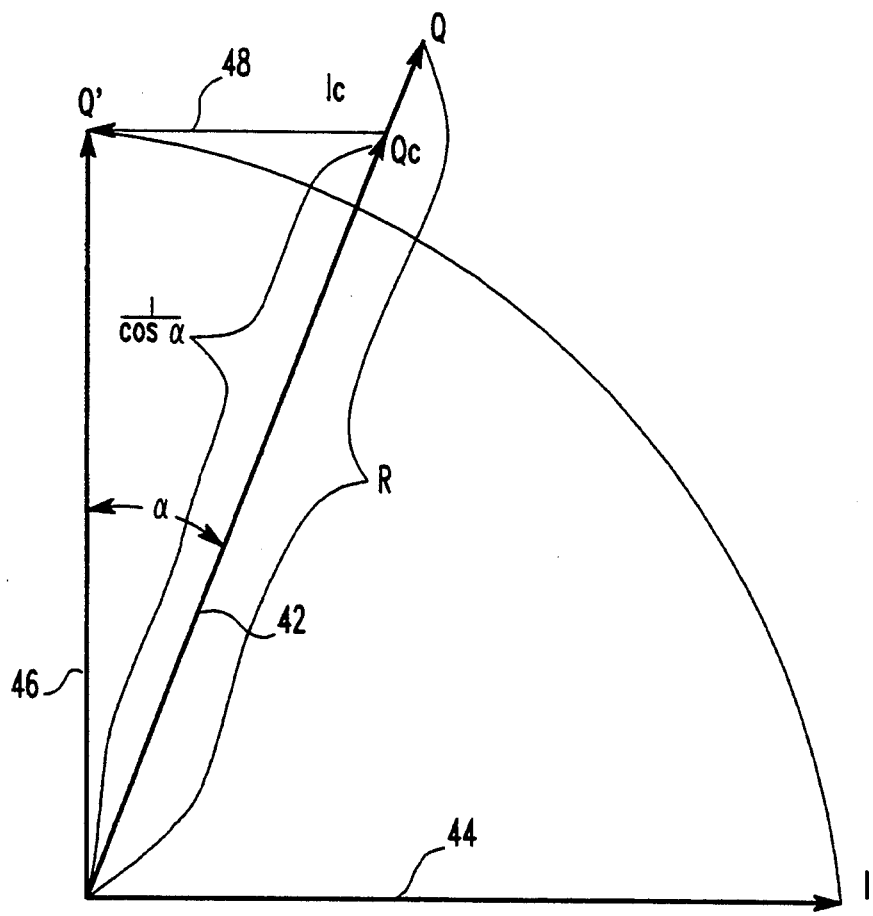
FIG. 2 is a vector diagram of the method performed by the system of FIG. 1.

For a more detailed description of the system of FIG. 1, a description of the principles of its operation will be given in connection with the diagram of FIG. 2 wherein an imbalance of the Q component is represented by a vector 42 which has a greater amplitude than the I component represented by vector 44. Vector 42 has a phase error represented by angle α. In order to be balanced, the amplitude of the vector 42 should be equal to the amplitude of vector 44, which equals vector 46 and the phase of the Q component should be ninety degrees from the vector 44 as represented by the direction of vector 46. The correction coefficients $P_c$ and $G_c$ are both used in obtaining the corrected vector as follows;

Since the line tangent $I_c$ represented by line 48 is equivalent to the tangent of the angle α, and R the gain imbalance factor of the Q channel, $|Q|$ to $|I|$ and $|Q_c|$ is equivalent to $$\frac{1}{\cos \alpha}, \text{ then}$$

$$Q' = Q_c + I_c$$

$$= Q \frac{1}{R \cos \alpha} - I \tan \alpha$$

Since the phase correction coefficient $P_c$ is equivalent to $-I_c$ and the amplitude coefficient $G_c$ is equivalent to $$\frac{1}{R^* \cos \alpha},$$

the imbalance of the I and Q channels is corrected by adding Q $G_c$ and I $P_c$ to obtain the corrected component Q'.

The system and method of the present invention is preferably implemented with programmed software/firmware, but may also be implemented in dedicated I/Q correction hardware. In carrying out the invention, the pilot tone, which is used to stimulate a condition to allow one to calculate the coefficients is subjected to the same quadrature conversion process with exactly the same apparatus as the received or return signal. The periodic calculation and/or re-calculation of the correction coefficients may be initiated manually, at intervals of time desired by the operator, or initiated periodically such as every five or ten minutes, for example, without attention on the part of the operator. The application of the pilot tone to the quadrature conversion elements requires a dedicated time when the radar signal is not being transmitted or received for generating and applying the test tone. However, with the method and system of the present invention this pilot tone may be the same tone used for other system calibrations such as monopulse calibration, stability test, or low frequency distortion test, for example.

In accordance with the invention, the correction coefficients for both the (I) and (Q) components of the received signal are calculated in the time domain in accordance with the samples taken from the (I) and (Q) components of the pilot tone.

Figure 6:
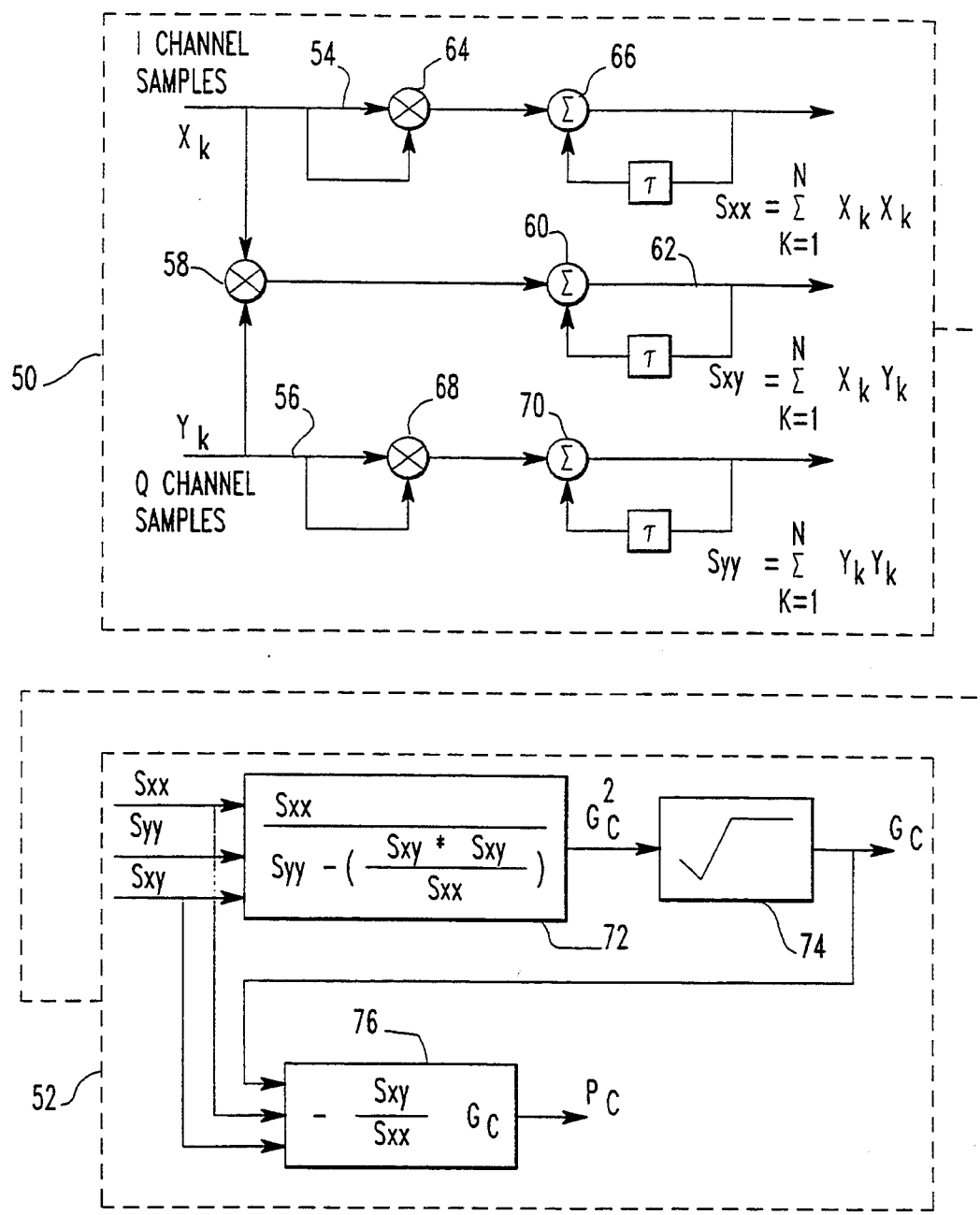
FIG. 6 is a functional block diagram of a system for calculating the coefficients.

As herein embodied and referring to FIG. 6, the calculation is divided into two major sections referred to within dashed lines 50 and 52. The I channel samples $Y_k$ are input over line 54 and the Q channel samples are input on line 56 to obtain the sums of the products in 50. $X_k$ and $Y_k$ are multiplied by multiplier 58 with the product being summed at 60 to obtain $S_{xy}$ which is a cumulative sum by adding the new sum term to the previous sum term for k terms where K=1 to N terms at 62. Similarly, $S_{xx}$ is obtained by multiplying the term by itself at 64 and summing the product at 66 in the same manner as the previously described in connection with $S_{xy}$. $S_{xy}$ is obtained by multiplying at 68 and summing at 70 in the same manner as $S_{xy}$ and $S_{xx}$. The gain and phase coefficients are obtained by the apparatus within the dashed lines 52. As value $G_c^2$ is first determined using the sums of the products $S_{xx}$, $S_{xy}$, and $S_{yy}$ as illustrated by the function in block 72. This result is then processed using Newton's iteration to find square root of $G_c^2$ to obtain $G_c$ the gain coefficient. The phase coefficient is determined simply from the ratio of two of the product terms multiplied by $G_c$ as illustrated by block 76. Both coefficients $G_c$ and $P_c$ have trigometric foundations which are interrelated as shown in FIG. 2.

The following is a print-out of a computer subroutine for determining the correction coefficients, and will be described in connection with FIGS. 3A and 3B.

```
20860   SUB Sptcal(INTEGER
        Gci,Pci,Buf1(*),Buf2(*),Iadc,Qadc,Errflag)
20870 Sptcal: !
20880       INTEGERN,N2,J,J2,L,Sv(1:4096),Sd,Idc,Qdc
20890       N=SIZE(Buf1,1)
20900       N2=N DIV 2
20910       IF ABS(Buf1(3)−Buf1(1))>ABS(Buf2(3)−
            Buf2(1)) THEN
20920           MAT Sv= Buf1    ! USE THE ONE
                                  THAT
20930           ELSE              ! HAS THE
                                   STEEPEST SLOPE
20940           MAT Sv= Buf2
20950       END IF
20960       L=Sv(1)
20970       Sd=Sv(3)-Sv(1)
20980       J2=N
20990       Iadc=(MAX(Buf1(*))+MIN(Buf1(*)))/2
21000       Qadc=(MAX(Buf2(*))+MIN(Buf2(*)))/2
21010       IF Sv(N)>L THEN Svgtl
21020 Svltl:REPEAT
21030       J2=J2−1
21040       IF J2=N2 THEN Exiterr1
21050       UNTIL Sv(J2)>L
21060       IF SGN(Sv(J2+1)−Sv(J2−1))=SGN(Sd)
            THEN
            Gotj2
21070 Svgtl:REPEAT
21080       J2=J2−1
21090       IF J2=N2 THEN Exiterr1
21100       UNTIL Sv(J2)<L
21110       IF SGN(Sv(J2+1)−Sv(J2−1))=SGN(Sd)
            THEN
            Gotj2
21120       GOTO Svltl
21130 Gotj2:DISP J2;"/";N;"     ";Sd
21140       Si=0
21150       Sq=0
21160       FOR J=1 TO J2
21170           Si=Si+Buf1(J)
21180           Sq=Sq+Buf2(J)
21190       NEXT J
21200       Idc=Si/J2
21210       Qdc=Sq/J2
21220       Sxx=0
21230       Syy=0
21240       Sxy=0
21250       FOR J=1 TO J2
21260           Xi=Buf1(J)−Idc
21270           Yq=Buf2(J)−Qdc
21280           Sxx=Sxx+Xi*xi
21290           Syy=Syy+Yq*Yq
21300           Sxy=Sxy+Xi*Yq
21310       NEXT J
21320       T=100^2*J2/2
21330       IF Sxx<T OR Syy<T THEN Exiterr2
21340       Gr=Sxx/(Syy-Sxy*Sxy/Sxx)
```

-continued

```
21350       Gc=(Gr+1)/2
21360       REPEAT
21370           Gcold=Gc
21380           Gc=(Gc+Gr/Gc)/2
21390       UNTIL ABS(Gc-Gcold)<1.E−3
21400       Gci=Gc*8192
21410       Pci=-Sxy/Sxx*Gci
21420       Iadc=Idc
21430       Qadc=Qdc
21440 Exiterr0:Errflag=0
21450       SUBEXIT
21460 Exiterr1:Errflag=1
21470       SUBEXIT
21480 Exiterr2:Errflag=2
21490       SUBEND
```

Figure 3A:
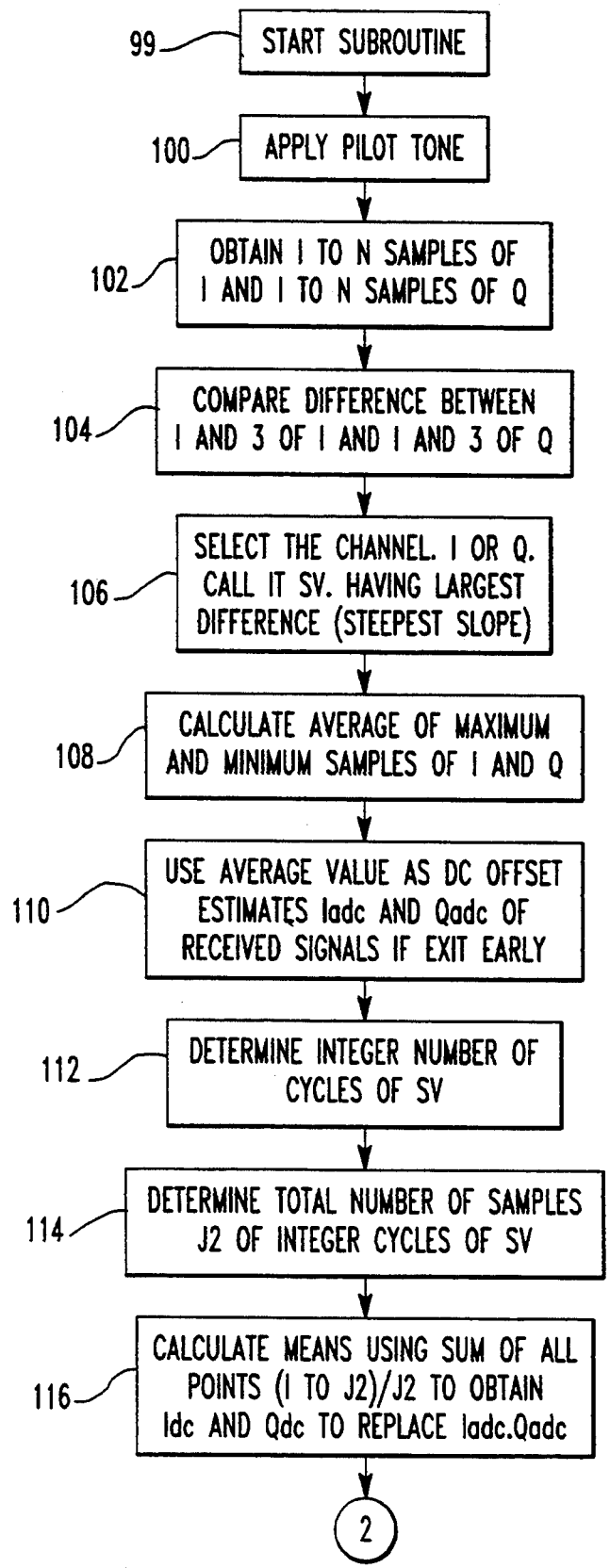
FIGS. 3A and 3B is a flow chart of the method for obtaining the amplitude and phase correction coefficients of FIG. 1 and 2 in accordance with one embodiment of the present invention.
Figure 3B:
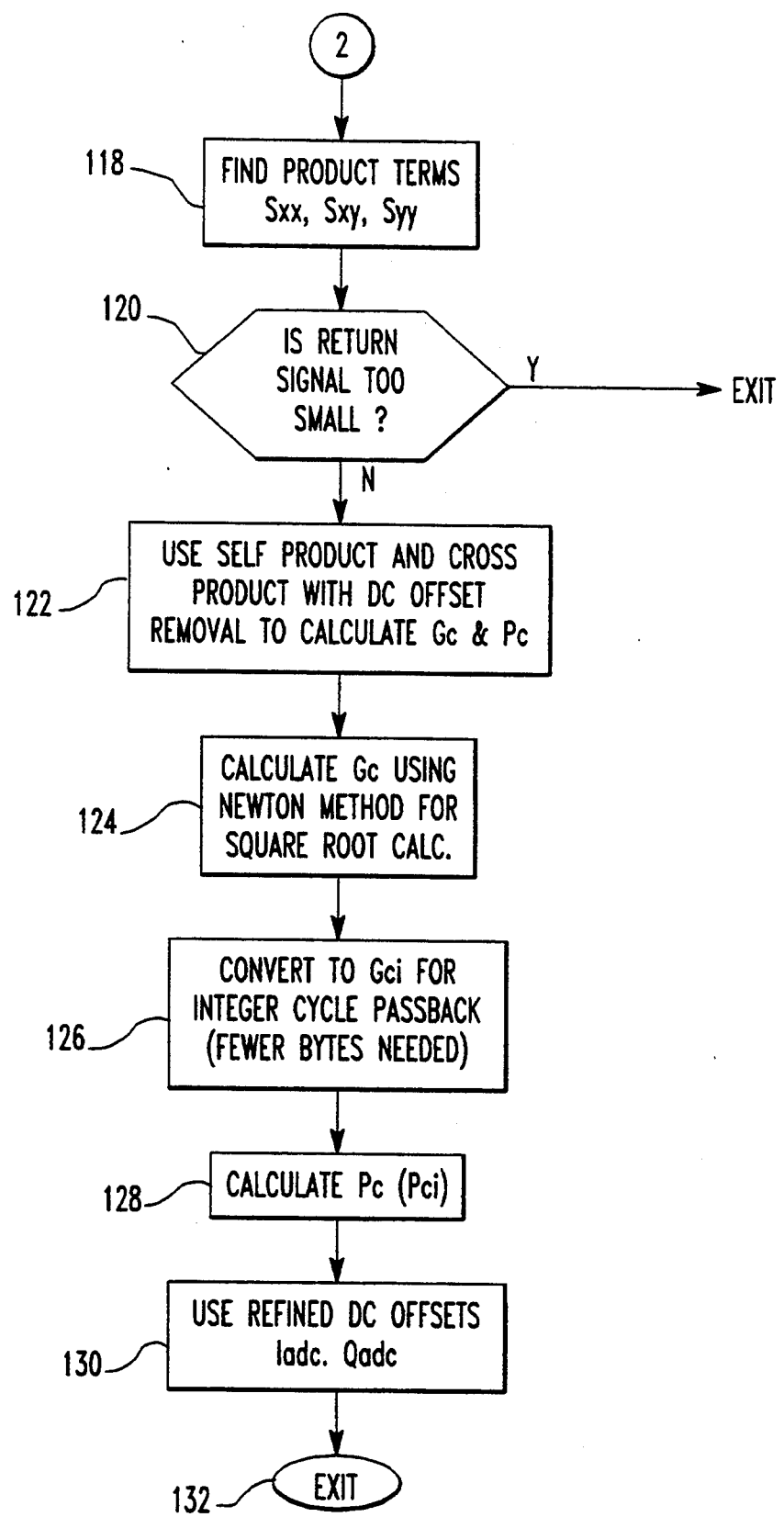

As embodied herein and referring to FIGS. 3A and 3B and the above program listing, the subroutine for obtaining the correction coefficients is started as previously indicated at step 99 by applying the pilot tone to the apparatus for converting the return signals to I and Q components and converting the I and Q components to digital signals as indicated at step 100. The digitized pilot tone I and Q components are then sampled throughout a minimum of one integer cycle and preferably collecting approximately 1000 samples for a good signal to noise ratio.

The size of the memory or buffer for storing the samples of each of the components is referred to as N as indicated at line 20890 of the listing and step 102 of the flow chart. As indicated in the flow chart, the difference in value between the first and third sample of each of the components is compared at step 104 for determining the component with the greatest difference as indicated at step 106, and thus, the steepest slope as set forth in lines 20910 to 20950 of the listing. The buffer having the samples that correspond to the component with the steepest slope or vector is referred to as SV and selected for all calculations in arriving at the best integer number of cycles. The maximum number of samples in the selected buffer N is the initial value of J2 in line 20980 of the program listing. As indicated in step 108 Iadc and Qadc are initially estimated by using the average of the maximum and minimum values of the stored samples of both the I and Q components as shown in lines 20990 and 21000 of the listing and step 110 of the flow chart. These values are preliminarily used as DC offsets.

As indicated in step 112, and integer number of pilot tone cycles, and the total number of samples that are stored during the integer number as shown by step 114 are then determined for all subsequent calculations. In other words, if the pilot tone is sampled 4,096 times over five and one half cycles, for example, then the largest number of integer cycles is five in which approximately 3725 samples were taken. This total number of samples for integer cycle or cycles is referred to as J2 in the program listing. In determining the total number of samples J2 for the integer number of complete cycles, the samples are compared with the first sample SV(1) of the selected vector to determine the relative magnitude, the sign, and number of the samples. If the total number of samples, which samples one referred to herein at times as points, is less than one cycle, then the program exits and can start over with a higher frequency pilot tone or more samples of the same frequency. The end of an integer number of cycles is determined by a change in the sign of the slopes as shown by the iterations from line 21010 through 21120 of the listing.

As shown in step 116 of the flow chart, the method then includes calculating a refined estimate of the means of the samples using the sum of all points (1−J2) divided by J2 to obtain DC offsets Idc and Qdc to replace Iadc and Qadc offsets respectively. To obtain the Idc and Qdc offsets the samples from both the buffers buf1 and buf2 are used, each of which is divided by the total number of samples J2. These calculations are listed in lines 21140 through 21210 of the listing.

In step 118, product reruns of Sxx, Sxy, and Syy are determined for samples 1−J2. As shown in the program listing, the value Xi corresponds to each of the samples in BUF1-Idc, and the value $Y_q$ corresponds to the samples in Buf 2-Qdc. Thus, as indicated in step 122, self product and cross product with DC offset removal is used in determining the coefficients Gc and Pc. This part of the method is set forth in lines 21220 through 21310 of the listing.

A decision block 120, a query is made as to whether the input signal is too small; i.e., is Sxx or Syy less than T, which is defined in lines 21320 of the listing where T is equal to some chose minimum acceptable level, here chosen to be 100 (full scale signals are expected to be >8000). If Sxx or Syy is too small, the program exits. If they are not too small, then Gc is calculated at step 124 according to Newton's method for square root calculation according to the formula $$Gc = \sqrt{\frac{Sxx}{Syy - \left(\frac{Sxy \times Sxy}{Sxx}\right)}} = \frac{1}{R\cos\alpha}$$

which is set forth in lines 21340 through 21390 of the program listing.

At step 126, the gain coefficient Gc is multiplied by 8192 which corresponds to a convenient scale factor for obtaining Gci in line 21400 of the listing in order to provide integer parameter pass back, which requires fewer bytes. Next, one calculates the phase coefficient Pc, which calculation is indicated at step 128. The phase coefficient Pc (or Pci) is determined in accordance with the formula $$-\frac{Sxy}{Sxy} \times Gc = -\tan\alpha$$

as set forth in line 21410 of the program listing.

The DC offsets are then updated with the refined values at step 130 and the subroutine exits at 132, which occurs in lines 21420 through 21430 of the listing if there are no errors.

A high dynamic range radar receiver system that included an I/Q correction system and method as above described and with the correction coefficients ascertained in accordance with the described embodiment produced excellent results at or near the frequency of the test tone. The hardware board correction circuit as shown in FIG. 1, which was designed specifically for image correction, used two (ASIC) gate arrays and a single multiplier chip. Since the embodiment described herein is a single point image correction method, that is, correction is for a single frequency, it is subjected to the frequency dependence of and characteristics of the analog quadrature components. Therefore, single point correction systems and method in general give excellent results near the frequency of calibration. However, frequency dependency is not a burdensome limitation for applications where the gain and phase errors are relatively flat near the frequency of the pilot tone.

Figure 4:
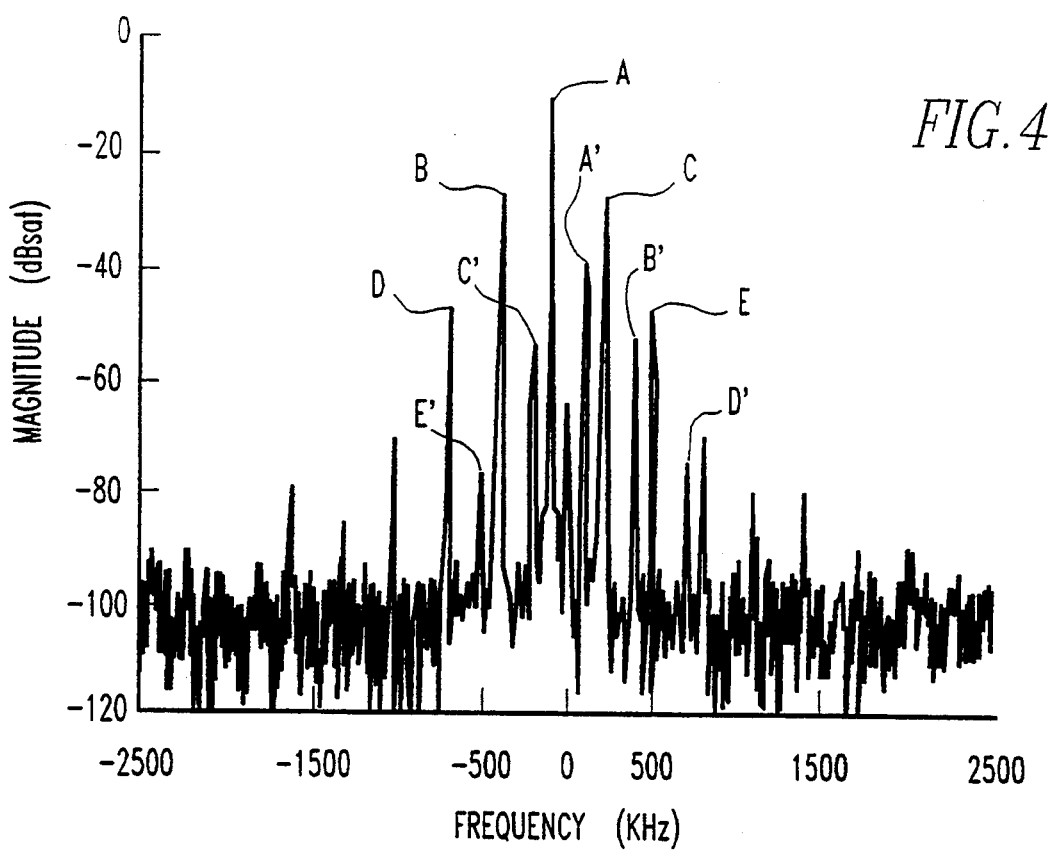
FIG. 4 is a graphical representation of a frequency response prior to correcting imbalance of I and Q components.
Figure 5:
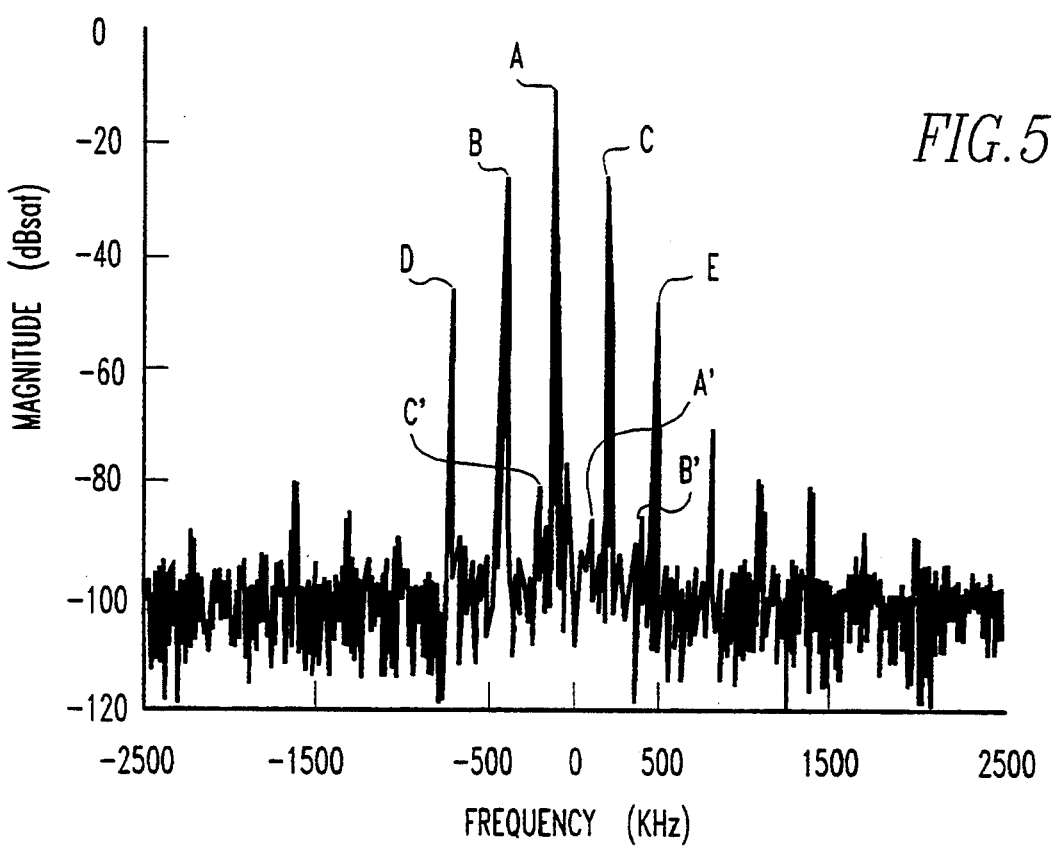
FIG. 5 is a graphical representation of a frequency response with correction applied by coefficients calculated in accordance with the method of FIG. 3.

Referring to the magnitude VS frequency diagrams of FIGS. 4 and 5, the effects of using I/Q correction on a frequency modulated (FM) signal is shown. These illustrations are representative of a typical signal with many carrier frequencies present at one time. All of these frequencies must be improved (corrected) without destroying or otherwise modifying the desired signals.

In FIG. 4 before correction, the desired signals are identified as A, B, C, D, E, while the undesirable signals are referred to as A′, B′, C′, D′, and E′. Note that the undesirable signals extend between minus forty dB to slightly less than minus seventy dB. Note the symmetry of the frequency locations reflected about the middle of the diagram corresponding to DC or zero frequency.

In FIG. 5, which shows the results corrected in accordance with the system and method of the present invention, note that the desired signals A through E are present undistorted at the same levels as FIG. 4 while the signals A′−E′ are substantially reduced. The signal A′ is down from A by over seventy dB. The worst signal C′ is down from C by about fifty-five dB. Signals D′ and E′ are indistinguishable from the noise.

In summary, the system and method of the present invention produces image rejection as effectively as the systems and methods heretofore developed but provides for calculation of the correction coefficient in a simpler and more efficient manner. For example, the system and method for determining the coefficients described herein places no restrictions on the relationship of the test frequency and the rate of sampling, does not require any FFT processing, and does not require any transcendental or higher mathematical function. In fact, in determining the $P_c$ and $G_c$ coefficients, only simple four function arithmetic is required to provide a clear, concise application of gain and phase coefficients to the Q channel to form a corrected Q channel.

It will be apparent to those skilled in the art that various modifications and variations can be made in the system and method of the present invention without departing from the spirit or scope of the invention. Thus, it is intended that the present invention cover the modifications and variations of this invention provided they come within the scope of the appended claims and their equivalents.

What is claimed is:

1. A method for correcting phase and amplitude imbalances between in-phase (I) and quadrature (Q) phase components of a return radiant energy signal, comprising:

converting each of the (I) and (Q) phase components of the return signal into digital data;

calculating solely in time domain, phase and amplitude coefficients for correcting digital data of the (Q) phase component of the return signal in accordance with the number and amplitude of samples taken from a selected one of the I and Q components of a pilot tone during an integer cycle of at least one cycle of the pilot tone;

multiplying the digital data of the (I) component by the phase coefficient to obtain a first product;

multiplying the digital data of the Q component by the amplitude coefficient to obtain a second product; and adding the first and second products to obtain a corrected Q component having a phase and amplitude substantially corresponding to the quadrature phase and amplitude of the (I) component.

2. The method of claim 1 wherein the step of calculating the phase and amplitude coefficients, comprises the substeps of determining the total number of time samples of the selected one of the I and Q components taken during the at least one integer cycle; and calculating the amplitude and phase coefficients in accordance with the determined total number of time samples.

3. The method of claim 2 wherein the step of calculating the phase and amplitude coefficients comprises the substeps of calculating the mean value in accordance with the sum of all the determined total number of samples to obtain a DC offset value;

find self product and cross product terms of the determined number of samples; and calculating the amplitude coefficient in accordance with the self product and cross product terms.

4. The method of claim 3 wherein the substep of calculating the amplitude coefficient in accordance with the product terms comprises the substeps of calculating the phase coefficient in accordance with the amplitude coefficient and the cross products terms.

5. The method of claim 3 further comprising the step of adding the DC offset values to the I and Q components of the radiant energy signal.

6. A method of calculating image correction coefficients for I and Q components of a radiant energy signal, comprising:

generating I and Q components of a pilot signal, having a selected frequency, at times when the radiant energy signal is not being transmitted or received;

sampling N time samples of both the I and Q components of the generated pilot signal;

selecting the N time samples of one of the I and Q components having the steepest slope;

determining the total number of time samples of the selected component taken during an integer cycle of at least one complete cycle of the sampled pilot signal;

calculating the average value of each of the corresponding samples of the I and Q components of the pilot signal;

calculating the sums of the products of each of corresponding determined number of samples of the I and Q components of the pilot signal; and calculating the amplitude and phase image correction coefficients in accordance with the calculated sums of the products of the average value of the determined number of samples.

7. The method of claim 6 wherein the step of determining the total number of time samples includes determining the total number of samples taken during a plurality of integer complete cycles of the pilot signal.

8. A system for correcting phase and amplitude imbalances between in-phase (I) and quadrature (Q) phase components of a return radiant energy signal, comprising:

means for converting each of the (I) and (Q) phase components of the return signal into digital data;

means for calculating solely in time domain, phase and amplitude coefficients for correcting digital data of the (Q) phase component of the return signal in accordance with the number and amplitude of samples taken from a selected one of the I and Q components of a pilot tone during an integer cycle of at least one cycle of the pilot tone;

means for multiplying the digital data of the (I) component by the phase coefficient to obtain a first product;

means for multiplying the digital data of the Q component by the amplitude coefficient to obtain a second product; and means for adding the first and second products to obtain a corrected Q component having a phase and amplitude substantially corresponding to the 90 degree phase and amplitude of the (I) component.

9. The method of claim 8 wherein means for calculating the phase and amplitude coefficients, comprises means for determining the total number of time samples of the selected one of the I and Q components taken during the at least one integer cycle; and means for calculating the amplitude and phase coefficients in accordance with the determined total number of time samples.

10. The system of claim 9 wherein the means for calculating the phase and amplitude coefficients comprises means for calculating the means value in accordance with the sum of all the determined total number of samples to obtain a DC offset value;

means for determining self product and cross product reigns of the predetermined number of samples; and means for calculating the amplitude coefficient in accordance with the self product and cross product terms.

11. The system of claim 10 wherein the means for calculating the amplitude coefficient in accordance with the product terms comprises means for calculating the phase coefficient in accordance with the amplitude coefficient and the cross products terms.

12. The system of claim 10 further comprising means for adding the DC offset values to the I and Q components of the radiant energy signal.

13. A system for calculating image correction coefficients for I and Q components of a radiant energy signal, comprising:

means for generating I and Q components of a pilot signal, having a selected frequency, at times when the radiant energy signal is not being transmitted or received;

means for sampling N time samples of both the I and Q components of the generated pilot signal;

means for selecting the N time samples of one of the I and Q components having the steepest slope;

means for determining the total number of time samples of the selected component taken during an integer cycle of at least one complete cycle of the sampled pilot signal;

means for calculating the average value of each of the corresponding samples of the I and Q components of the pilot signal;

means for calculating the sums of the products of each of corresponding determined number of samples of the I and Q components of the pilot signal; and means for calculating the amplitude and phase image correction coefficients in accordance with the calculated sums of the products of the average value of the determined number of samples.

14. The system of claim 13 wherein the means for determining the total number of time samples includes means for determining the total number of samples taken during a plurality of integer complete cycles of the pilot signal.

15. A method of determining solely in the time domain phase and gain coefficients for correcting imbalances between (I) in-phase and (Q) quadrature phase components of a received radiant energy signal, comprising:

applying I and Q components of a pilot signal to an analog to digital converter means, sampling the amplitude of the pilot signal for an integer of at least one complete cycle, determining the total number of samples for the integer of at least one complete cycle, calculating the sums of the determined total number of samples to obtain the means of the samples corresponding to DC offsets for the received signals;

calculating the sums of the product means, and calculating the amplitude and phase coefficients in accordance with the sums of the product means and the DC offsets.

* * * * *